June 13, 1944.  F. H. BEACH  2,350,998
PIN SPREADER
Filed July 20, 1942
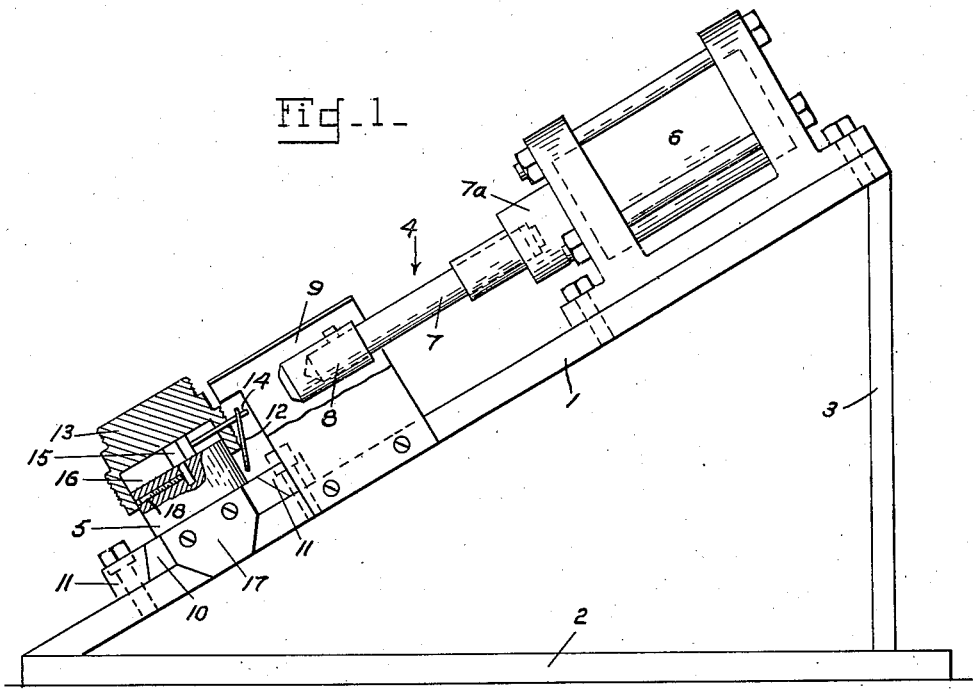
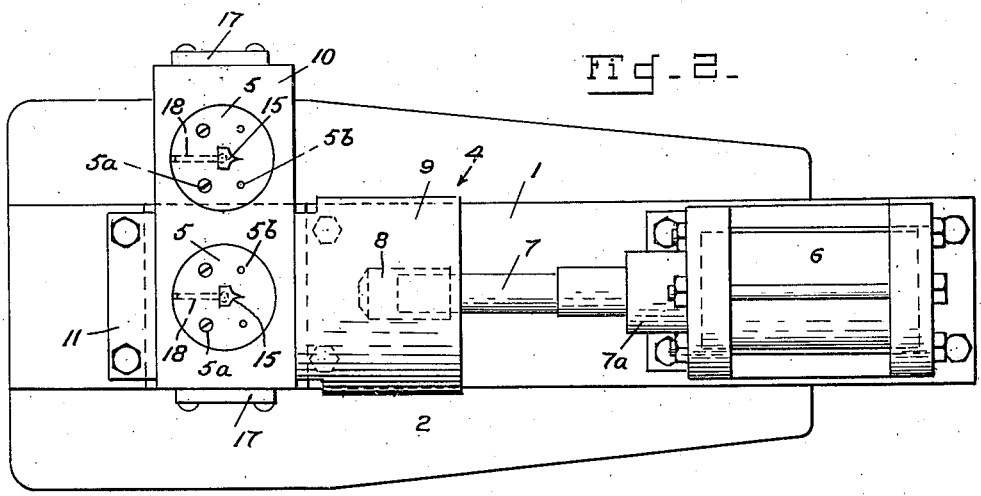
Inventor
Frederick H. Beach
By G. J. Kesenich & J. H. Church
Attorneys Patented June 13, 1944

2,350,998

UNITED STATES PATENT OFFICE 2,350,998

PIN SPREADER

Frederick H. Beach, Denville, N. J.

Application July 20, 1942, Serial No. 451,675

2 Claims. (Cl. 153—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a machine for spreading the ends of cotter pins.

An object of this invention is to provide a machine for spreading cotter pins to obtain a uniform and reproducible spreading of the ends so that the pins will require a uniform effort for their removal. Another object of the invention is to provide a machine of the character described in which a plurality of articles to be fitted with cotter pins may be indexed successively to a pin setting station in the machine while other articles are prepared for the setting of the pin. Another object is to provide in such a device means for preventing the split ends of the pin from being excessively bent and thereby rendered difficult to remove without breaking.

Other objects and advantages of the invention will be in part apparent and in part pointed out in the following detailed description of a preferred embodiment as shown in the accompanying drawing in which:

Figure 1 is a side elevation of the device with parts broken away and,

Figure 2 is a view of the device taken normally to the inclined bed supporting the working parts.

The machine according to the invention includes a bed, a fixture on said bed for holding an article to be cottered, a pin spreading template in alignment with the cotterway of said article and means for pressing a cotter pin against said template. Preferably, the device includes a plurality of fixtures, each of which includes a pin spreading template, all mounted on a table or slider capable of being indexed to position said fixtures successively in operative alignment with the press.

Referring now to the drawing, 1 represents the bed plate supported in inclined position by a standard composed of a base plate 2 and a vertical supporting member 3. Preferably the bed plate and standard are formed of sections of steel plate welded together, but the structure may be built in any suitable manner. Upon the bed plate are mounted a machine press 4 and means 5 for holding articles to be cottered. The machine press includes a cylinder 6, a reciprocable shaft 7, a piston 7a, and a head 8 for applying pressure to the cotter pins. A hood 9 may be provided for reasons of safety. The means 5 for holding articles to be cottered is an upstanding cylindrical boss mounted on a slider 10 by means of countersunk screws 5a and dowel pins 5b. The slider rests on bed plate 1 between rails 11 and is movable transversely of the bed plate. In this particular embodiment the bosses 5 are designed to hold an artillery ammunition booster 13. A cotter pin 14, provided with pulling ring 12, is inserted in the booster cotterway with the split ends of the pin lying in a plane parallel to the base plate, the ends of the pin being in contact with the vertical knife-edge of the spreading template 15, which template is fixed to the cylindrical boss 5 by depending pin 16 and set screw 18. Pressure is applied to the eye end of the pin by the head 8 of the machine press forcing the pin into the booster and against the template 15. The ends of the cotter pin ride over the cam surfaces of the template and, in so doing are spread open to a degree determined by the configuration of the template.

In the embodiment shown in the drawing, the slider is provided with two bosses 5 which may be placed alternately in operative position under the head of the press. Stops 17 are fastened to each end of the slider and come in contact with the sides of the bed plate to limit the lateral movement of the slider and to determine the operative position of the fixtures, and these stops may be provided with adjustable features. While one booster is under the head of the press, a finished booster is removed from the other boss 5, another booster is placed on this boss and a cotter pin is inserted preparatory to being spread. After the pin has been spread in the one booster, the slider is moved to bring the finished booster out of alignment with the machine press and the booster is removed from the fixture. This operation moves the other booster into operative position under the press.

The machine press preferably is operated by compressed air, and any suitable control means, for example, a foot control pedal, may be provided for actuating the press. While two bosses have been shown in the drawing, a greater or smaller number may be mounted on the slider as desired.

The operation of the machine has been described in connection with the structure.

I claim:

1. A machine for spreading the ends of cotter pins, comprising a bed, a plate slidably mounted on said bed for transverse movement thereon, a plurality of bosses on said plate each provided with a pin spreading template thereon, a reciprocable head for engagement with the eye and of a cotter pin when a template is in line with said head, means for reciprocating the head, and means carried by the plate for engagement with a fixed part of the machine to stop the plate with a boss in line with the reciprocable head in either direction of movement of the plate.

2. The invention according to claim 1 characterized in that the stop means carried by the slidable plate comprises a downwardly extending projection secured to each end of the plate and adapted to engage the opposite sides of the bed in the movement of the plate from one side to the other thereof.

FREDERICK H. BEACH.